United States Patent [19]

McDilda

[11] Patent Number: 4,895,083
[45] Date of Patent: Jan. 23, 1990

[54] WHOLE TIRE DISPOSAL SYSTEM

[76] Inventor: John A. McDilda, P.O. Box 351, Claxton, Ga. 30417

[21] Appl. No.: 270,512

[22] Filed: Nov. 14, 1988

[51] Int. Cl.$^4$ .................... F23G 5/12; B09B 3/00
[52] U.S. Cl. ...................................... 110/235; 55/308; 55/487; 110/216; 110/229; 110/346
[58] Field of Search .................. 55/308, 487; 110/346, 110/229, 235, 216

[56] References Cited

U.S. PATENT DOCUMENTS

| | | | |
|---|---|---|---|
| 2,997,131 | 8/1961 | Fisher | 53/308 X |
| 3,266,228 | 8/1966 | Plizak et al. | 55/487 X |
| 3,888,642 | 6/1975 | Toyanda | 55/308 X |
| 3,960,508 | 6/1976 | Bessant et al. | 55/308 X |
| 4,084,521 | 4/1978 | Herbold et al. | 110/346 X |
| 4,452,154 | 6/1984 | Kono et al. | 110/346 |
| 4,648,328 | 3/1987 | Keough | 110/229 |
| 4,829,911 | 5/1989 | Nielson | 110/216 X |

*Primary Examiner*—Edward G. Favors
*Attorney, Agent, or Firm*—John J. Byrne

[57] ABSTRACT

An apparatus and process for the decomposition of waste tires while removing and recovering important segments of the oils and carbon black residues of combustion through a system of sequentially arranged tanks through which the gases of combustion are caused to travel a tortuous path. The fan that draws the gases of combustion through the intake tanks then blows the partially-cleaned gases through a system of sequentially arranged exhaust tanks that completes the removal of carbon black and also filters obnoxious and deleterious materials form the gases prior to discharge to the atmosphere.

32 Claims, 5 Drawing Sheets

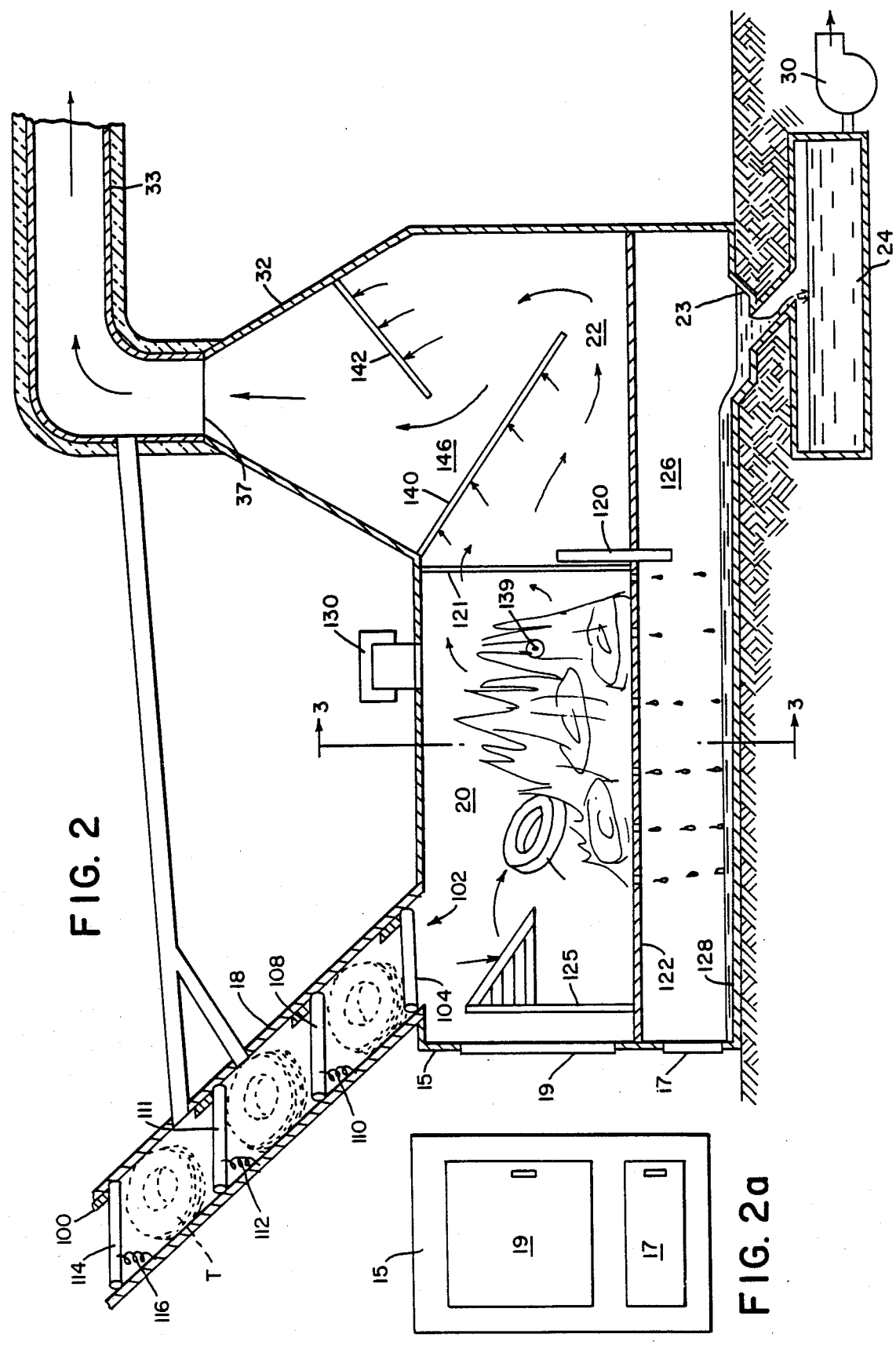

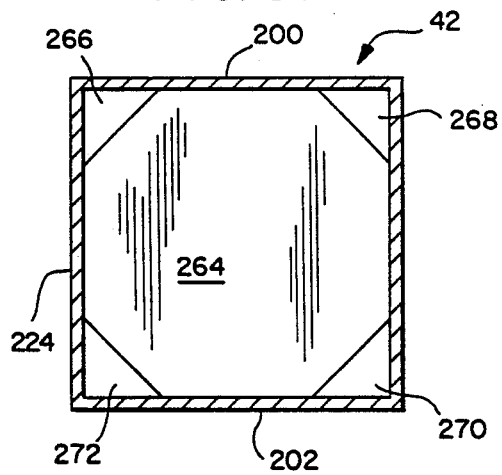
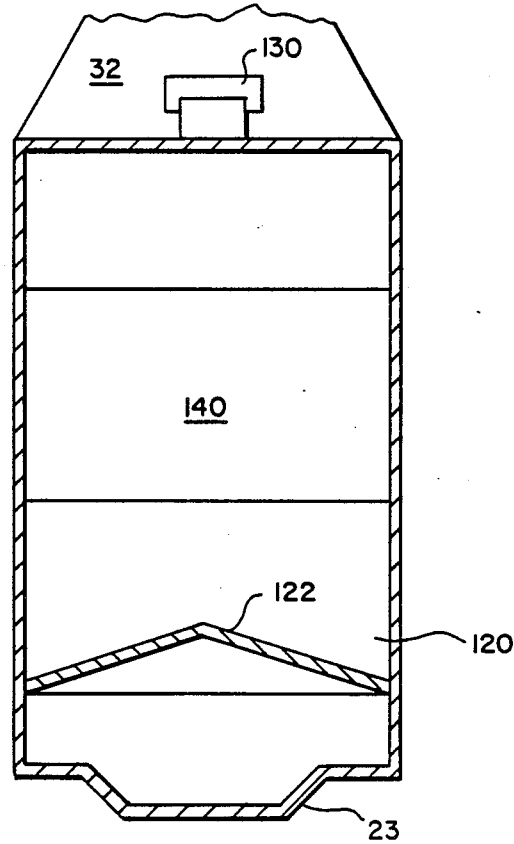
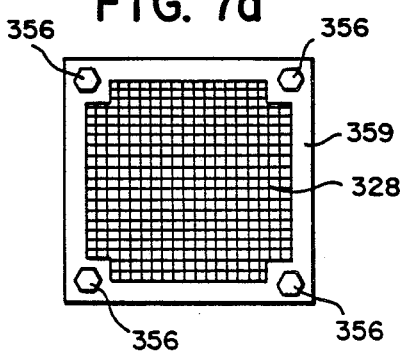
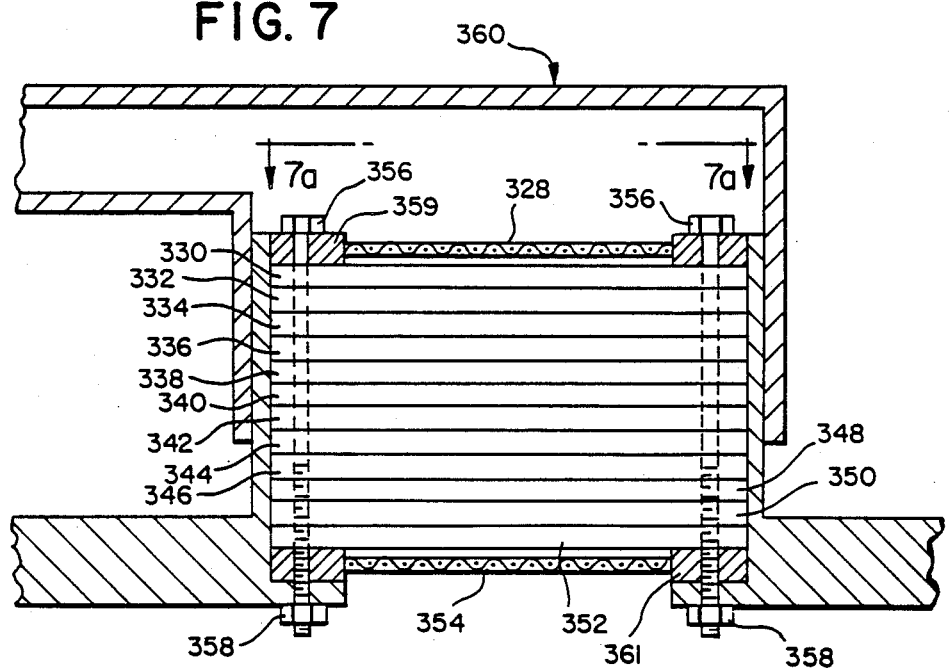

WHOLE TIRE DISPOSAL SYSTEM

BACKGROUND OF THE INVENTION

There have been many systems proposed for decomposing whole and fragmented tires (hereinafter referred to as "waste tires") in a manner that recovers some of the various components of manufacture such as gas, oil, steel and carbon black. These systems suggest that they can perform those functions in an economical fashion and without damage to the environment. These prior art systems have not proved to be as commercially viable and as effective as the public had hoped. Some of these systems require the tires to be fragmented into workable pieces prior to processing. Other prior art systems provide an autoclave system for melting. The present invention utilizes controlled combustion with vacuum and is designed in a manner so that the heat of combustion can be readily utilized for the co-generation of energy and the recovery of the aforementioned useful components.

SUMMARY OF THE INVENTION

The invention described herein is directed toward a closed system that provides an incinerator for burning waste tires together with means to remove the oils of a combustion in the combustion housing. The gases and particulates (hereinafter sometimes referred to as "emissions") of combustion are drawn through a plurality of cooling tanks and are subsequently drawn through a series of laterally placed tanks equipped with mesh filters and nearly solid baffles that are designed to cause the carbon black and gases to travel a tortuous path through a series of intake and exhaust tanks. After traversing these tanks, a blower mechanism draws the emissions through a first set of tanks and then forces the gases through a second set of sequentially and laterally arranged exhaust tanks. The exhaust tanks are designed to remove the remaining amounts of carbon black and to filter any deleterious or obnoxious gases prior to return to the atmosphere and to return the remainder of the gases to the incinerator system.

A principal objective of this invention is to provide a closed system which is economic in construction, simple in operation, is portable and can process a great many tires continuously without harm to the surrounding environment and, at the same time, economically recover important oils, steel and carbon black and any other materials that were the original components of tire manufacture.

Another important objective of this invention is to provide a unique series of intake tanks that sequentially subject the gases and particulates of combustion to a tortuous path that causes the gas to relinquish its carbon black to removal traps that are formed along the bottom of each tank.

A still further objective of the invention is to provide a series of exhaust tanks that sequentially receive the gases and particulates of combustion and provide filters that remove harmful substances from the gases prior to discharge to the atmosphere.

A still further important objective is to provide a tire disposal system in which the tires are burnt and the heat of combustion is readily usable in energy recovery systems of a type that uses hot water and steam for the generation of energy.

Another objective of the invention is to remove substantial amounts of combustion heat for use and transmission to a cogeneration unit and to provide a system which efficiency removes the carbon black and other materials from the waste gases after cooling.

A further objective of this invention is to provide a process and apparatus for feeding waste tires into a combustion chamber while recovering the carbonaceous raw materials therefrom and to provide a chute in which to receive the tires in a manner that combustion emissions do not escape therefrom.

Another important objective of the invention is to provide a system for the combustion of tires wherein a forced-air system draws the combustion gases and particulates through a series of sequentially arranged exhaust tanks from which the emission gases are filtered prior to atmospheric discharge and the unfiltered emissions are returned to the incinerator.

A still further objective of the invention is to provide a closed system of the described type in which any gases that are not exhausted through the filter medium are returned to the combustion chamber for further processing.

Another important objective of the invention is to provide a system into which the products of combustion are subjected to a series of tanks in which any gas entrained particulates are removed without exhaust to the atmosphere.

These objectives of the invention will become more clearly understood upon a reference to the following specification and the attached drawings in which:

BRIEF DESCRIPTION OF THE DRAWINGS

FIG. 2 is a diagrammatic, longitudinal cross-section showing the combustion chamber, feeder chute and exhaust chamber of the incinerator of FIG. 1;

FIG. 2a is a left end view of the apparatus shown in FIG. 2;

FIG. 3 is a cross-sectional view of the housing of FIG. 2 along the line 3—3;

FIG. 5a is a cross-sectional view along the line 5a—5a showing a baffle shape;

FIG. 7 is a cross-sectional view along the line 7—7 of FIG. 6 showing the filter layers; and FIG. 7a is a top plan view of the filter unit shown in FIG. 7.

DESCRIPTION OF THE PREFERRED EMBODIMENT

Figure 1:
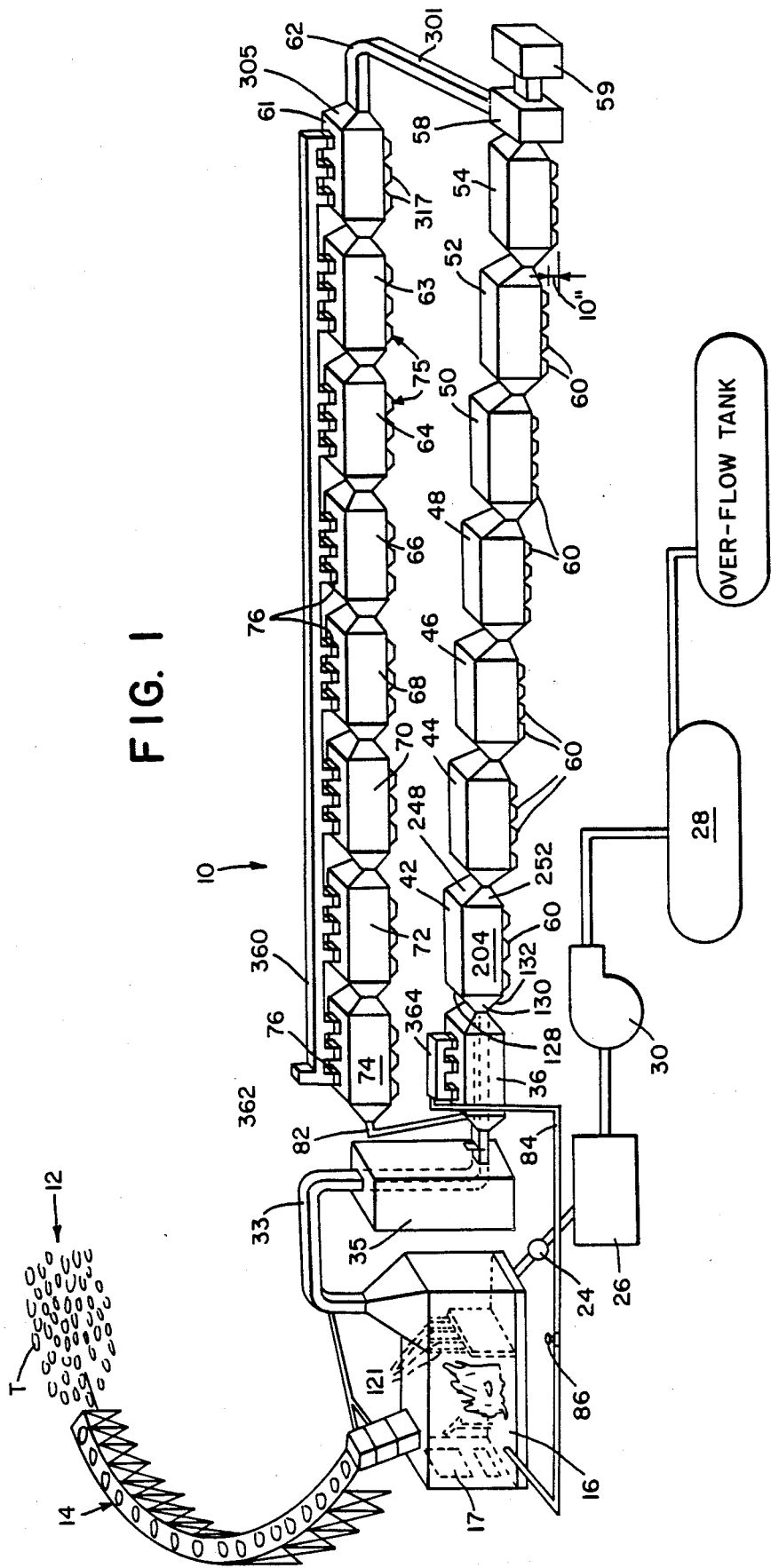
FIG. 1 is a diagrammatic perspective, with certain exaggeration for purposes of clarity, of the tire disposal system of this invention.

Referring now to the drawings wherein like numerals indicate like parts, the numeral 10 indicates the tire disposal system apparatus of this invention. A waste tire supply 12 is shown in FIG. 1 which is utilized as a source of tires by way of a conveyor system 14. The tires T are fed one-by-one into a combustion housing 16 through chute 18. The interior of housing or incinerator 16 is seen in cross-section in FIG. 2. At end wall 15 of the housing 16 is a draft or lower door 17. Also, end wall 15 is formed with a large access door 19 for the purpose of removing the residual components of tire combustion—e.g., ash and steel—and to introduce large earth-mover tires.

The housing 16 is divided into two principal chambers, namely; a combustion chamber 20 and an exhaust chamber 22. As the tires T burn, oils of combustion seep to the bottom of the chamber and thence to sump or sumps 23. From sump or sumps 23, the oil is extracted through a collection line in which valve 24 is disposed. Then, the oil is removed to an underground oil cooler 26. From the cooler 26, the oil is removed to an oil collection tank 28 by way of a pump 30. An overflow tank is provided as a safety measure.

The housing 16 has a vertically extending conical exhaust stack 32 spaced above chamber 22. One or more insulated conduits 33 collect the gases and particulates from stack 32. These emissions are drawn to the top of a vertical cooler 35. The conical stack 32 terminates in an opening 37 which has the same opening size as the draft door aperture 17. Likewise, the conduits 33 have a similar cross-sectional area. In the embodiment shown, the draft door 17 is approximately four feet by one foot for a total of four square feet and has a sliding member to adjust that area.

The vertical cooler 35 is filled with water. Exhaust emissions departing from cooler 35 are moved to a horizontal cooler 36 via the conduit 38. Cooler 36 is 75% filled with water and the empty portion defines a chamber 83.

After cooling, the emissions are drawn to a series of intake tanks 42, 44, 46, 48, 50, 52 and 54. At the outlet end 56 of the last tank 54, there is a reverse fan blower 58 powered by a power unit 59. The power unit 59 can be electric or it can be a combustion engine, whichever is appropriate to the locale in which the tires are being disposed. The blower 58 is set to draw emissions from housing 16 through tank 42 through 54. The fan of the blower is set to draw emissions from the incinerator. The interior of the intake tanks will be described in detail hereinafter. However, at this point, it should be noted that each intake tank is located approximately 10 inches lower than its adjacent upstream tank. Additionally, it should be noted that each tank has a carbon black extraction collectors 60 along their respective bottom walls.

By the time the gases reach blower 58, much, if not most, of the carbon black has been removed because of the interior configuration of the intake tanks and their declining intervals. The gases departing blower 58 moved to a first exhaust tank 61 through a conduit 62. These gases are moved sequentially from tank 61 through tanks 63, 64, 66, 68, 70, 72 and 74 in a manner to be described hereinafter.

The exhaust tanks are each equipped along their bottoms with additional carbon black collectors 75. Along their top edges, each of the exhaust tanks is equipped with filter stacks 76, each of which contains a filter 78. Although the pressure in the last exhaust tank 74 is reduced because of the pressure drops that take place through the system, any gases that are not exhausted through the filters 78 return to combustion chamber 16 via a conduit 82, chamber 83 of cooler 36, into a manifold 364 and through accessory piping 84.

Heretofore, an overview of the system has been presented. Now, the individual components thereof will be described. As seen in FIG. 2, the tires T enter the system via the slanted chute 18. The chute 18 and its components are diagrammatic but operation and construction will be readily understood by those skilled in the art. Chute 18 has an upper opening 100 and a lower opening 102. The lower opening is normally closed by a trap door 104 that is biased to its closed position against a lug by a spring 106. Upwardly of the trap door 104 is a second trap door 108 biased to its closed position by spring 112. A top trap door 114 is biased to its closed position by spring 116. The springs 106, 110, 112 and 116 are of a strength to permit each trap door to disengage from their respective lugs and to open upon being subjected to the weight of one tire. Therefore, the tires are delivered one-by-one down the slanted chute 18. The successive or series of trap doors will prevent combustion gases from escaping from housing 16 through chute 18. Note that a portion of the gases return to the system from the conduit 33 via conduit 37. This provides back static pressure in the system.

Although not shown, the combustion housing 16 can be lined with fire brick or the like. The housing is generally divided into the combustion chamber 20 and the exhaust chamber 22 by an iron partition 120 running transversely across the housing 16. The exhaust chamber 22 is disposed below stack 32. A high temperature grate 122 is disposed along the length of the housing 16 and is spaced from the housing bottom 128 approximately three feet to thereby define a chamber 126. A second grate 124 for retention of ash is disposed along the length of the housing approximately one foot from the housing bottom to define a chamber 129. The bottom 128 slopes slightly from left to right (in FIG. 2) toward sump 23. The grate 122 is of sufficient strength to support a plurality of tires thereon and is sufficiently apertured to permit the oils and ash of combustion to seep therethrough. As stated above, these oils are collected in sump or sumps 23. The transverse angle steel partition 120 and bars 121 retains the burning tires in the combustion chamber 20 and out of chamber 22. A tire diverter mechanism 125 will propel tires dropping from chute 18 over to the burn area.

The housing 16 is equipped with a safety mechanism 130 diagrammatically shown in FIG. 2. If something is not working properly in housing 16 and pressures reach unacceptable levels, a conventional safety valve 130 will relieve the system. Also shown diagrammatically is an ignition 139 which provides the means for initially igniting the tires.

The ashes dropping into chamber 129, the area defined by bottom 128 and grate 124, are removed by conventional means. Also remaining in chamber 20 after combustion will be steel which is removed by conventional means through access door 19.

As stated above, the draft control door 17 is approximately four feet by one foot and this defines an opening of four square feet. This will hereinafter be referred to as the pre-selected opening.

Returning now to the stack 32, there can be seen a downwardly angled steel baffle 140 approximately four feet in length. Angularly disposed with respect to this baffle is a second baffle 142 having its lower end 144 spaced from baffle 140 and defining a space 146 equal to four square feet or to the preselected opening. The stack 32 is conically tapered to its upper opening 37 which also has a dimension equal to the pre-selected opening. The stack can also have the shape of a pyramid.

Figure 4:
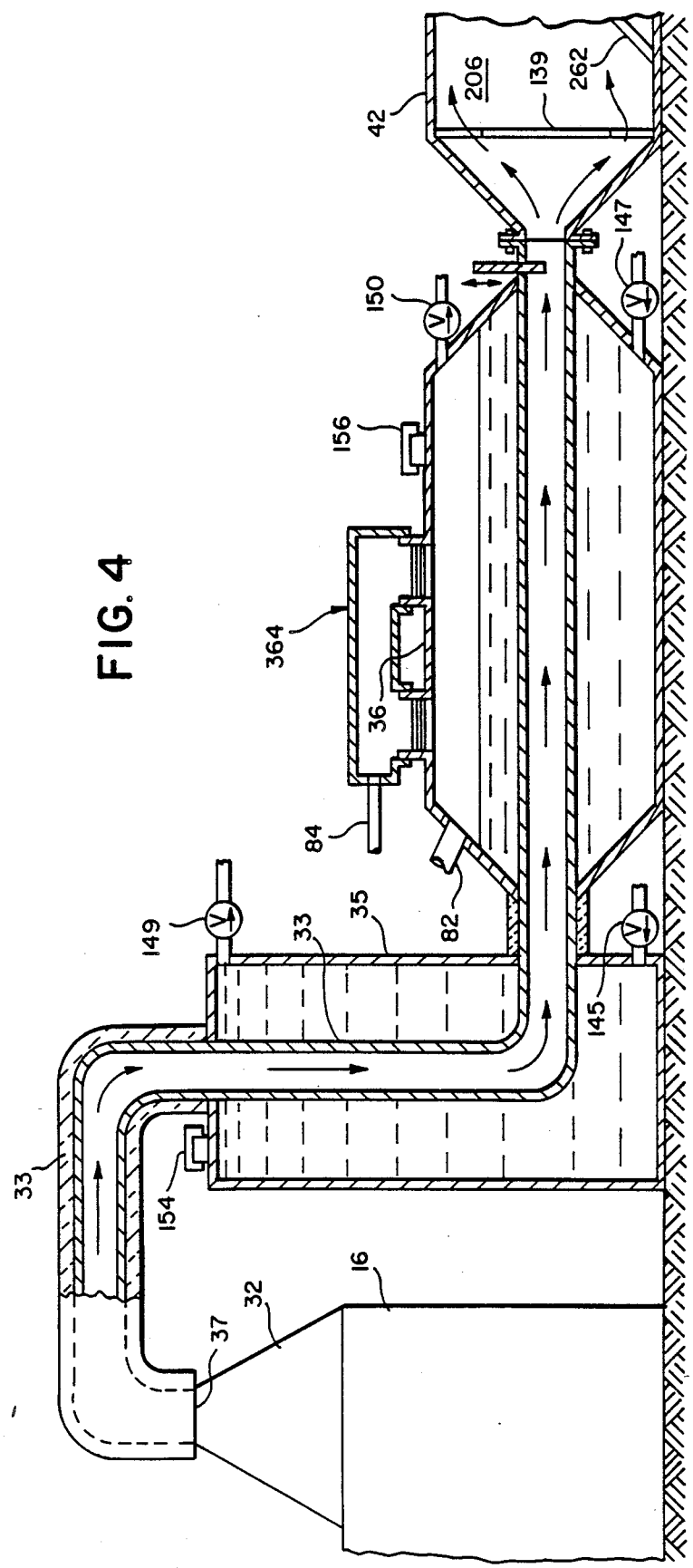
FIG. 4 is a diagrammatic elevation, partly in section showing a cooling system.

The tremendous heat developed from the combustion that takes place in chamber 22 is reduced in temperature by the coolers 35 and 36 as seen in FIG. 4. The conduit 33 traverses the water-filled coolers longitudinally thereof and provides for an efficient transfer of heat from the conduits to the water. The portion of conduit 33 between the stack and the cooler 35 is insulated. Water is continuously supplied to the cooling system at valves 145 and 147 and hot water is removed therefrom at valves 149 and 150. This heated water is transferred for use in an energy co-generation plant (not shown). The coolant tanks 35 and 36 are equipped, respectively, with pop-off safety valves 154 and 156.

Figure 5:
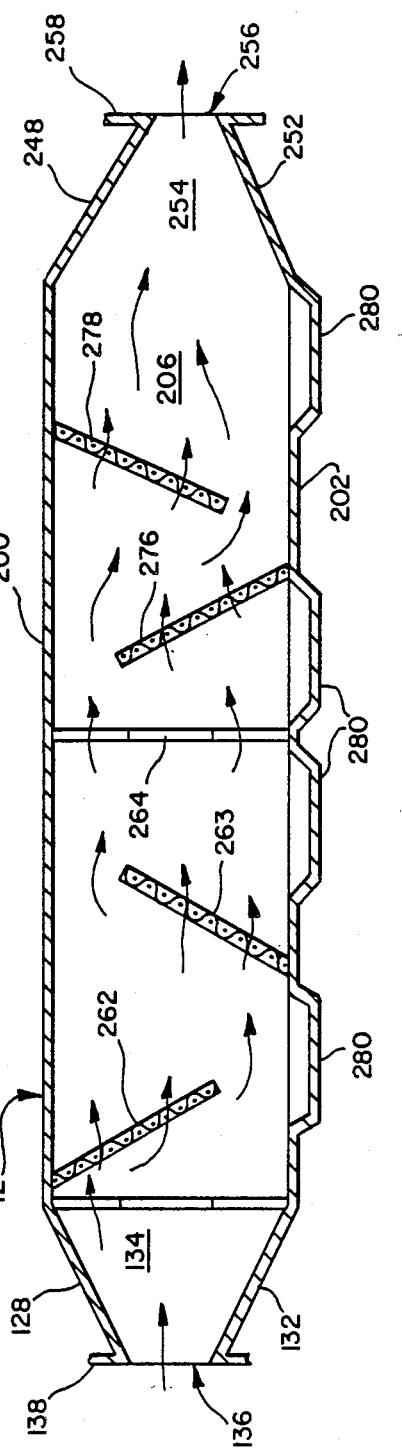
FIG. 5 is a longitudinal cross-sectional view of one of the intake tanks.

The cooled gases (along with the particulates) are then carried to the first intake tank 42 by way of conduit 149. The interior of the tank 42 is best seen in FIG. 5. Since all of the intake tanks are substantially the same, only tank 42 will be described in detail. Tank 42 is rectangular in shape having a top 200, a bottom 202 and parallel opposing side walls 204 and 206 of which only the interior of 206 can be seen in FIG. 5. The intake end of tank 42 is formed of four plates 128, 130, 132 and 134 forming a truncated pyramid defining an opening 136 that has a flange 138 thereabout. The flange provides a means for connection to conduit 149 leading from the cooling system that has a mating flange 152 allowing for ease of attachment. In the first intake tank only, an octagonal shaped vertical baffle 139 having two vertical sides welded to the sides 204 and 206 of the tank and its top and bottom sides fixedly welded to the top 200.

The tremendous heat developed from the combustion that takes place in chamber 22 is reduced in temperature by the coolers 35 and 36 as seen in FIG. 4. The conduit 33 traverses the water-filled coolers longitudinally thereof and provides for an efficient transfer of heat from the conduits to the water. The portion of conduit 33 between the stack and the cooler 35 is insulated. Water is continuously supplied to the cooling system at valves 145 and 147 and hot water is removed therefrom at valves 149 and 150. This heated water is transferred for use in an energy co-generation plant (not shown). The coolant tanks 35 and 36 are equipped, respectively, with pop-off safety valves 154 and 156.

The cooled gases (along with the particulates) are then carried to the first intake tank 42 by way of conduit 149. The interior of the tank 42 is best seen in FIG. 5. Since all of the intake tanks are substantially the same, only tank 42 will be described in detail. Tank 42 is rectangular in shape having a top 200, a bottom 202 and parallel opposing side walls 204 and 206 of which only the interior of 206 can be seen in FIG. 5. The intake end of tank 42 is formed of four plates 128, 130, 132 and 134 forming a truncated pyramid defining an opening 136 that has a flange 138 thereabout. The flange provides a means for connection to conduit 149 leading from the cooling system that has a mating flange 152 allowing for ease of attachment. In the first intake tank only, an octagonal shaped vertical baffle 139 having two vertical sides welded to the sides 204 and 206 of the tank and its top and bottom sides fixedly welded to the top 200 and bottom 202. This baffle 139 acts as a fire break to prevent any fire from entering any further into tank 42. Baffle 139 is the same as the solid baffle 264 shown in FIG. 5a.

At its departure end, the tank 42 is formed with another truncated pyramidal arrangement consisting of plates 248, 250, 252 and 254 leading to an opening 256. A flange 258 circumscribes opening 256 permitting its easy connection to the next tank 44 having a corresponding flanged opening. The openings 256 and 136 are of said pre-selected size.

As the gases and particulates enter opening 136, they pass by the fire break baffle 139 and proceed to a galvanized mesh screen 262 extending angularly downwardly from top 200. Those emissions that do not go through the mesh are directed downwardly by the first screen 262. The gases then approach a second galvanized mesh screen 263 angularly disposed to screen 262 and spaced approximately two feet therefrom. Again, some of the gases will traverse the meshed screen 263 and the rest will go around it.

Approximately mid-length of the intake tank 42 is a second vertical, solid baffle 264 of a generally octagonal design having two vertical sides welded to the sides 224 and 226 of the tank and its top and bottom sides fixedly welded to the top 200 and bottom 202 and thereby defining corner openings 266, 268, 270 and 272 (FIG. 5a) through which the gases pass. The gases then strike a mesh screen 276 that is angled toward baffle 264 and generally parallel to mesh screen 262 and thence to a mesh screen 278 that is generally parallel to a mesh screen 263. The lower end of baffle 278 is spaced approximately two feet from an intermediate portion of baffle mesh 276. From there, the gases exit through opening 256 which is to be connected to the next tank 44.

The disrupted and misdirected emissions follow the tortuous path created partly by the mesh screens and partly by the solid baffles. This causes a substantial amount of the carbon black to drop into extraction collector traps 60 that are located under the bottom 202. Openings to the collectors are provided from which the carbon black can be extracted. The gases continue along the tortuous paths in the sequentially arranged tanks until they reach the outlet end 56 of tank 54. They are then drawn into the blower 58. By this stage, much, if not most of the carbon black, has been removed from the gas stream.

It should be noted that in each of the intake tanks, opening 136 is approximately ten inches higher than opening 256. This permits each of the tanks to be approximately ten inches lower than its upstream tank as the tanks approach blower 58. It is believed that the successively lower tanks aid in the gravitational action of the carbon black toward the carbon black collectors 60.

The blower 58 is the transition point between what is generally referred to as intake and what is referred to as exhaust. The blower 58 forces the gas stream into the first exhaust tank 61 via conduit 62 to opening 302. The length of conduit 62 is exaggerated in FIG. 1 so that an overall view can be presented. In practice, the conduit 62 will be short and the series of intake tanks and series of exhaust tanks will be parallel and relatively close together. The exhaust tank 61, 63, 64, 66, 68, 70, 72 and 74 are rectangular in shape and are of generally the same size and shape as the intake tanks. Tank 61 is formed with a top 304, a bottom 306 and a pair of side walls 308 and 310. Only wall 310 can be seen in FIG. 6. Since the exhaust tanks are all generally constructed in the same manner, only exhaust tank 61 will be described in detail.

Each exhaust tank has a size-reduction truncated pyramid 305 leading to an opening 302 and the outlet end is formed with the same design as 305 leading to an outlet 307. These pyramidal constructions are generally the same as those for the intake tanks. In the exhaust tank 61, the emissions first engage or strike a solid baffle 309 and then are directed downwardly toward the slanted mesh screen 311. Gases which do not traverse the mesh screen 311 are forced upwardly into filter assembly 78. The opening between solid baffle 309 and mesh screen 311 is approximately the same as the preselected opening. Emissions passing through screen 311 are disrupted by an octagonal shaped, vertical baffle 313 the shape of which is the same as those found in the intake tanks. After the emissions pass about the nearly solid baffle 313, they pass through and about another mesh screen 314 generally parallel to screen 311 and angled upwardly from the bottom 306. Gases are forced about another solid baffle 315 and to baffle screen 318. Although much of the carbon black has been removed by the time the gases reach the exhaust tanks, collectors 350, 352 and 354 are provided for that which remains.

In its upper surface 304, the tank 61 is formed with the plurality of filter receptacle 76, each of which receives a filter assembly 78.

It should be understood that there is a slight pressure drop as the gases traverse the exhaust tanks 61 through 74. In each exhaust tank, there is a pressure higher than atmospheric pressure permitting the gases to traverse the filter assemblies 78. The gases that do not exit the filter assemblies in tank 61 are transferred through outlet 307 and to the next exhaust tank and so forth to the last tank 74. The pressure in each tank drops as it approaches the last tank.

Figure 6:
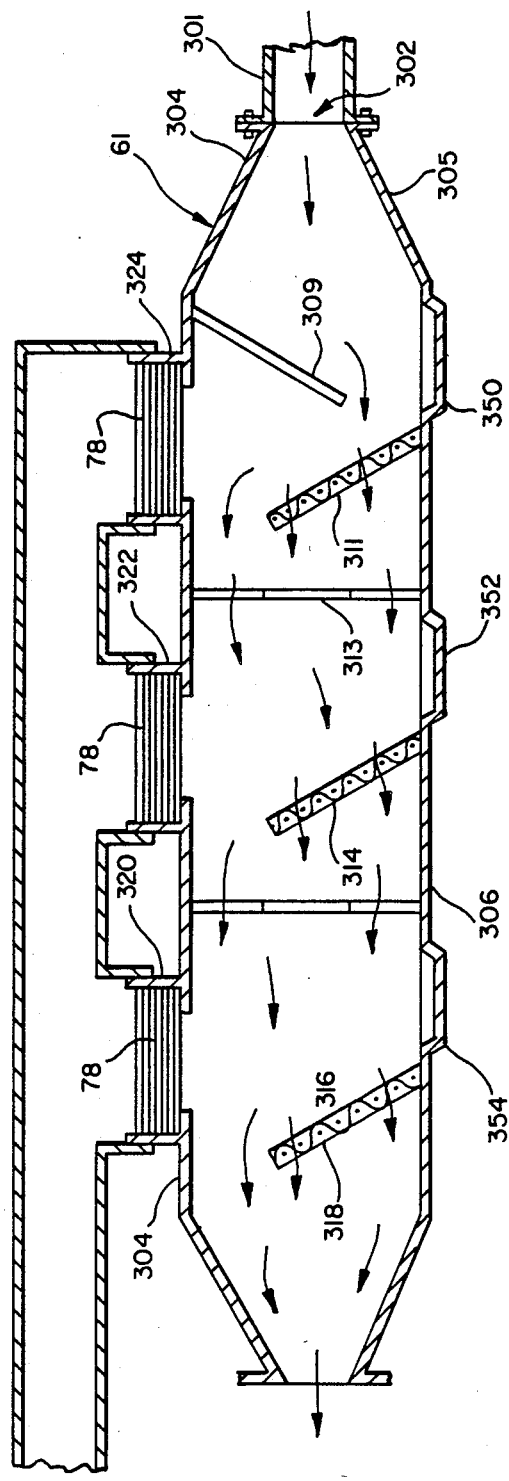
FIG. 6 is a longitudinal cross-sectional of one of the exhaust tanks.

The filter assemblies 78 are best seen in FIG. 7 which is a cross-section along the lines 7—7 of FIG. 6 from top to bottom, the assemblies consist of the following layers:

328—wire;
330—burlap;
332—foam;
334—cloth;
336—$NaHCO_3$;
338—cloth;
340—burlap;
342—cloth;
344—$AgO_3$;
346—cloth;
348—burlap;
350—foam;
352—burlap;
354—wire If, in the future, the composition of tires changes and unknown pollutants are detected, other layers can be provided to remove these pollutants. The aforementioned filter assembly, however, has been found effective in removing any deleterious elements from reaching the atmosphere when processing today's waste tires. The filter assemblies can be squeezed together by transverse wing bolts 356 and nuts 358 arrangement. As plates 328 and 354 are drawn together, the density can be varied and thus increasing their resistance to gas penetration. The filters in the first tank 61 will be more dense than in tank 74 to provide more resistance. The filters of tanks 64 through 74 will vary accordingly.

On occasion, it is necessary to chemically check the purified gases exiting the filters 78 for purity. In order to simplify this checking procedure, all of the outlet receptacles of the tanks are joined by a manifold 360. When a manifold is used, purity of the exhausts can then be checked collectively at the single outlet 362.

The purified gas that does not exit through the filters and exhaust chimney 362 are returned to the incinerator via pipe 82, chamber manifold 364 and pipe 84 in which the valve 86 is disposed.

In operation, the system of this invention receives tires through the angled, trap door chute 18 wherein the tires successively pass through a series of trap door devices and are propelled to the combustion chamber 20. The tires are received on the heat-resistant grate 122 in a median area within the housing 16. Combustion takes place in this area and the oils of combustion are removed from the housing 16 through oil traps and the gases and particulates exit via the conical stack 32. The gases are cooled in a series of coolers 35 and 36. The coolers are adapted for use with co-generation systems.

The emissions then travel through a series of intake tanks having truncated pyramidal openings wherein the flow is disrupted and misdirected through a series of screens and baffles. Each intake tank is equipped with a solid vertical baffle having corner openings and slanted mesh baffles of decreasing size. The interrupted flow continuously causes carbon black to gravitate toward collection boxes located at the bottom of each intake tank.

The emissions of combustion are drawn through the intake tanks by way of blower 58 that provides evacuation pressures of approximately six to seven pounds of psig. The fan is conveniently powered by an electric motor or a combustion engine 59. From the draft door 17 in the housing through to the blower, there are series of pre-selected openings of approximately four square feet. There is a pressure drop across each opening and the gases will travel at a rate consistent with a substantially complete removal of carbon black.

The series of pre-selected openings limit oxygen intake which controls the rate at which the tires will burn. The preselected openings do not only establish the rate of the burn but control the magnitude of the burn. Thus, a proper balance between gas emission and vacuum within the system can be maintained.

Fuel oil recovery is accomplished by means of several sumps 23. The ashes of combustion are removed by conventional means. For instance, ashes can be removed by a motor-driven conveyor (not shown) located below the grate 122. The steel remaining after combustion can be removed by multi-tined rakes (not shown) through door 19.

In practice, it has been found that an optimum burning temperature of approximately 2300° to 2500° F. is desirable. This can be termed rapid burn. Blower 58 during the initial ten minutes is operated at about 1500 rpm to establish a vacuum draft.

The above-described system is comprised of a series of tanks, both intake and exhaust, each having the purpose of sequentially absorbing certain by-products of tire combustion. The system can be continuously operated and is capable of processing hundreds of tires per hour without creating undesirable environmental problems. The invention also provides a heat exchange mechanism that is readily adaptable for use with a cogeneration system for electricity. Additionally, the system economically preserves a high degree of carbon black and a good percentage of the fuel oil that sweats from the tire during combustion.

In a general manner, while there has been disclosed an effective and efficient embodiment of the invention, it should be well understood that the invention is not limited to such an embodiment as there might be changes made in the arrangement, disposition and form of the parts without departing from the principle of the present invention as comprehended with the scope of the accompanying claims.

I claim:

1. Apparatus for the processing of tires and the recovery of carbon black, oils and other components therefrom, comprising:
   a substantially horizontal incinerator housing having a front end, a rear end, a top wall and a bottom;
   first means dividing said chamber into a burn chamber and an exhaust chamber;
   a grate disposed in said housing substantially parallel to said bottom and spaced therefrom;
   second means to feed tires into said burn chamber;
   third means in said burn chamber to ignite tires therein;
   said incinerator formed with an air inlet draft opening having a pre-selected dimension;
   fourth means below said grate for collecting oil resulting from burning said tires;
   a stack disposed over said exhaust chamber and in communication therewith;
   first and second baffles in said stack and defining an opening approximating said preselected dimension;
   a cooling means;
   a first intake tank;
   a conduit between said exhaust chamber and said intake tank that traverses said cooling means;
   a blower having an intake and an outlet; a series of tanks between said first tank and said blower;
   fifth means serially communicating all of said intake tanks with said blower;
   power means causing said blower to draw gases of combustion through said air inlet draft opening and subsequently through said stack, cooling means and said first and series of said intake tanks;
   a plurality of exhaust tanks serially communicated with one another and said blower outlet;
   filter means in each of said exhaust tanks; and
   sixth means causing said gases of combustion to return to said incinerator or to atmosphere through said filter means.

2. The system of claim 1 wherein said second means is a slanted chute formed in communication with said housing; and
   a series of spring-closed trap doors are spaced intermediate the length of said chute that open when the weight of a tire is placed thereon;

3. The system of claim 2 wherein:
   a tire deflection shield is disposed in said housing below said chute for positioning tires in said burn chamber after they exit said chute.

4. Apparatus for processing used tires while recovering certain by-products of combustion thereof, comprising:
   a substantially horizontal incinerator housing having a top wall, a bottom, a pair of side walls, front end and an exit end;
   first means dividing said housing into a burn chamber and an exhaust chamber;
   a grate disposed in said housing substantially parallel to said bottom and spaced therefrom;
   second means to feed tires into said burn chamber;
   said incinerator formed with an air inlet having a pre-selected opening;
   an exhaust stack in communication with said exhaust chamber and receiving products of combustion;
   a fan having an inlet and an outlet for drawing air through said draft opening through said burn chamber and into said stack;
   a series of intake tanks between said stack and said fan inlet;
   a second series of exhaust tanks in communication with one another and with said fan outlet;
   flow interruption means in said intake tanks for causing gases passing therethrough to drop carbon black therefrom; and
   exhaust filter in said exhaust tanks for cleansing said gases prior to communicating them to the atmosphere.

5. The apparatus of claim 4 wherein said flow interruption means are a plurality of mesh screens in each of said tanks and a substantially solid baffle therebetween having a plurality of openings near its edge.

6. The apparatus of claim 5 wherein said exhaust tanks include a series of wire mesh screens mounted generally traverse to said exhaust tanks and each having a substantially solid baffle having a peripheral edge disposed thereacross and said solid baffle forming openings between the interior side of said tank and said peripheral edge.

7. The invention of claim 6, wherein:
   said series of exhaust tanks include a first tank and a last tank;
   a conduit means communicating said last exhaust tank to said incinerator;

8. The invention of claim 4 wherein carbon black receptacles are formed in the bottom of each of said intake tanks.

9. The invention of claim 8 wherein carbon black receptacles are formed in the bottom of each of said exhaust tanks.

10. The invention of claim 4 wherein:
    each of said tank inlet and exhaust openings define the said dimension of said pre-selected opening.

11. A system for the recovery of carbon black from the gases of combustion caused by burning tires, comprising:
    an incinerator in which said tires are burned and having a draft opening defined in one end thereof;
    a blower having an inlet and an outlet;
    a plurality of intake tanks between said inlet and said incinerator all in communication with one another;
    a second plurality of exhaust tanks between said outlet and said incinerator; and
    power means connected to said blower and arranged to have gases drawn from said intake tanks and into said exhaust tanks.

12. The system of claim 11 wherein baffle systems in said intake tanks misdirect the flow of said gases drawn there.

13. The system of claim 12 wherein baffle systems in said exhaust tanks misdirect the flow of gases forced there.

14. The system of claim 13 wherein each of said inlet and exhaust tanks have carbon black traps formed therein.

15. An exhaust tank for use with a combustion incinerator for used tires wherein the gases of combustion are received by said tank comprising:
    a top wall, a bottom wall, a first said wall and a second said wall defining a tank interior;
    a truncated pyramidal-shaped end defining a gas reception inlet;
    a second truncated pyramidal-shaped end defining a gas outlet;
    a first baffle mounted to said top wall and extending downwardly across said tank and spaced near said inlet;

a mesh baffle mounted on said bottom wall and extending upwardly across said tank and spaced from said first baffle;

an octagonal solid baffle across said tank defining corner edge openings with said tank interior; and third and fourth mesh baffles disposed between said solid baffle and said gas outlet.

16. The invention of claim 15, wherein:

a plurality of carbon black traps are disposed in said bottom wall to trap carbon black falling toward said bottom resulting from the misdirected flow caused by said solid baffle and said mesh baffles.

17. The invention of claim 16 wherein said gas outlet is nearer to said bottom wall than said inlet.

18. The invention of claim 16 wherein at least some of said mesh baffles have a different mesh size than other of said mesh baffles.

19. The invention of claim 16 wherein said mesh sizes are increasingly smaller as they approach said outlet.

20. An exhaust tank, comprising:

a substantially box-like housing having first and second side walls, a bottom wall and a top wall defining an interior;

a first end and a second end;

a first member enclosing said first end of said housing except for an inlet opening;

a second member enclosing the second end of said housing except for an outlet opening coaxial with said inlet opening;

a substantially solid baffle disposed across said tank but defining corner openings with said interior;

a plurality of screens across said tank on either side of said solid baffle;

21. The invention of claim 20 wherein said screens are of increasingly smaller mesh as they approach said outlet.

22. The invention of claim 21 wherein a plurality of filters are disposed in said top wall.

23. The invention of claim 22 wherein said filters are multi-layered and designed to filter any deleterious material from gases in said tank.

24. The invention of claim 23 wherein manifold means collect all of the gases exiting said filters.

25. The invention of claim 24 wherein:

adjustable compression means can alter the density of said filters.

26. The invention of claim 25 wherein said adjustable compression means comprises:

a first plate at one end of each of said filters;

a second plate at a second end of each of said filters; and means to draw said first plate toward said second plate.

27. The method of extracting usable components of combustion from burning tires and preventing the exhaustion of pollutants into the atmosphere by the steps of:

burning the tires in an incinerator;

collecting the oils sweating from said tires as they burn;

drawing the gases of combustion from said incinerator through a series of tanks by a blower drawing said gases through said tanks;

exhausting said gases from an outlet from said blower into a series of communicating exhaust tanks; and filtering said gases as they depart from said exhaust tanks.

28. The method of claim 27 including the step of:

misdirecting the flow of said gases as they proceed through each of said intake tanks.

29. The method of claim 28 including the step of:

misdirecting the flow of said gases as they proceed through said exhaust tanks.

30. The method of claim 29 including the step of:

removing the carbon black from said intake and exhaust tanks.

31. The method of claim 30 wherein any gases not exhausted through filters are returned to said incinerator for further combustion.

32. The invention of claim 31 wherein said gases, as they proceed through said intake and exhaust tanks, travel through mesh baffles of successively fine mesh.

* * * * *